H. C. CLAY.
CLUTCH.
APPLICATION FILED SEPT. 18, 1916.
1,253,787.
Patented Jan. 15, 1918.
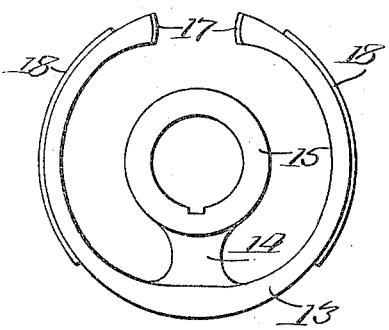
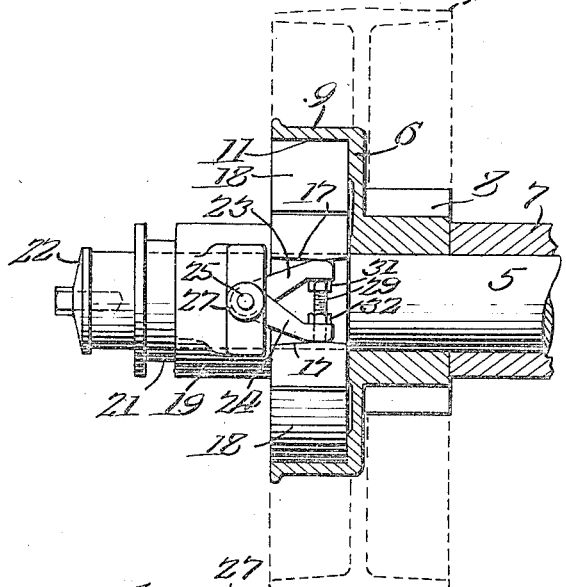
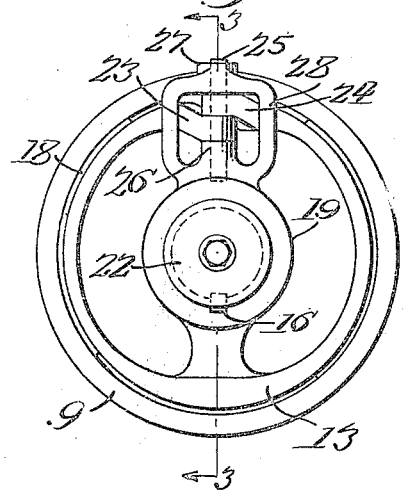
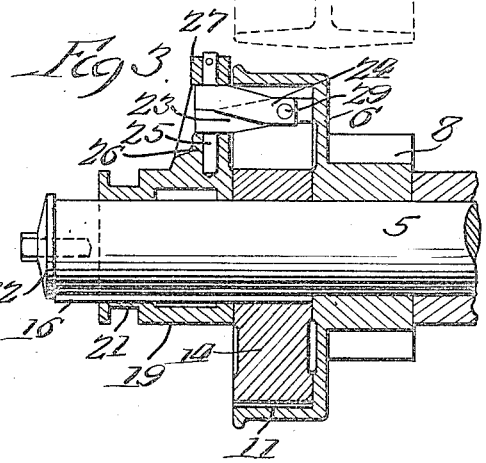
Inventor:
Harry C. Clay
By Pond & Wilson
Attys.

UNITED STATES PATENT OFFICE.

HARRY C. CLAY, OF COLUMBUS, INDIANA, ASSIGNOR TO EMERSON-BRANTINGHAM COMPANY, OF ROCKFORD, ILLINOIS, A CORPORATION OF ILLINOIS.

CLUTCH.

1,253,787. Specification of Letters Patent. Patented Jan. 15, 1918.

Application filed September 18, 1916. Serial No. 120,871.

*To all whom it may concern:*

Be it known that I, HARRY C. CLAY, a citizen of the United States, residing at Columbus, in the county of Bartholomew and State of Indiana, have invented certain new and useful Improvements in Clutches, of which the following is a specification.

This invention relates to frictional clutches and more particularly to those adapted for heavy service such as farm machinery operated by gas engines. Machinery of this and analogous types which is produced at comparatively low cost is in consequence somewhat rough and heavy but primarily it must be strong and durable as it is subjected during usage to heavy strains and while being transported about is exposed to all weather conditions.

In providing a clutch especially adapted for machinery of this type, although equally well usable with machines of other types, the primary object of my invention has been to design an improved clutch which shall consist of but few parts simple in design so as to be capable of production at a low cost and strong and substantial in construction so as to withstand the most severe service requirements.

With these ends in view I have provided a clutch of the type which comprises an expanding friction shoe adapted to engage an internal drum and have provided means of novel construction for expanding the shoe which means are capable of simple and easy adjustment to obtain proper frictional engagement and to take up wear.

Referring to the drawing,

Figure 1 is a plan view partially in horizontal section of a clutch embodying my improvements, showing the clutch engaged;

Fig. 2 is an end view of the clutch;

Fig. 3 is a vertical sectional view taken on the line 3—3 of Fig. 2; and

Fig. 4 is a detail view of the friction shoe.

The driving and driven members of the clutch are represented generally by reference characters 5 and 6, respectively. The driving member in the form of a shaft may be suitably journaled as, for instance, in a bearing 7 so that the clutch may be supported from one side of a machine. Suitable means (not shown) may be provided for driving the shaft 5. The driven member consists in the present instance of a spur pinion 8 journaled on the shaft 5 in abutting relation with the bearing 7 and a drum 9 formed integral with the pinion and having an internal peripheral face 11 which serves as one of the friction faces of the clutch. It should be understood that the pinion of the driven member meshes with a spur gear and thus transmits the power to whatever mechanism is to be driven. The driven member shown is particularly adapted for driving a train of gears on a baling press or any similar machine but should it be desired to employ the clutch in a machine requiring a belt drive, a pulley indicated in dotted lines 12 in Fig. 1 might be formed integral with the drum 9 in place of the pinion 8. In other words, the clutch, as will be more readily apparent hereinafter, is designed so that it may be easily and quickly converted from a gear to a belt driving clutch by interchanging the drum.

The outer side of the drum is left open to allow entrance of an expanding friction shoe into the drum compartment. This friction shoe, best shown in Fig. 4, consists of a split band 13 joined diametrically opposite its ends by a web 14 to a collar 15 secured by means of a key 16 to the shaft 5. The friction shoe may be cast to this shape, and its opposed ends 17 are shaped to provide tapered faces extending longitudinally of the axis of the driving member and converging toward the closed side of the drum. These faces may converge entirely across the ends of the arms if preferred, although in practice it is usually sufficient to terminate their convergence about two-thirds across the ends of the arms as shown. There is sufficient resiliency in the arms of the friction shoe to enable them to be expanded and contracted by moving an expander lengthwise of and in engagement with the faces 17. Friction facings 18 of some suitable material, having a high co-efficient of friction and lasting wearing qualities, such as leather, processed fabric, or the like, are rigidly secured to the outer faces of the arms of the friction shoe.

A collar 19 splined on the shaft 5 by means of the key 16 carries a pair of expander jaws interposed between the faces 17 and is adapted to be moved longitudinally on the shaft 5, by suitable means, to engage and disengage the clutch. The collar may be moved longitudinally by well known means such as a yoked operating lever or a trunnioned collar (not shown) engaged in the annular groove 21 in one end of the collar. An end plate 22 bolted to the end of the shaft 5 and projecting beyond the periphery thereof serves as a stop to limit outward movement of the collar on the shaft.

The expander jaws 23 and 24 are pivotally mounted on a common pivot pin 25 extending radially of the collar 19 and are retained in position by means of inner and outer bearing supports 26 and 27, respectively, formed integral with the collar, the bearing 27 being supported in spaced relation from the inner bearing by means of the arched construction 28. By reason of this construction the expander jaws interposed between the supports 26 and 27 and mounted on the pivot pin 25 are supported in a very simple, substantial and rigid manner. The expander jaws extend divergingly from their mounting and engage at their outer ends the opposed tapered faces 17. Means interposed between the free ends of the jaws hold them in fixed relative relation against inward movement and enable them to be relatively adjusted to effect greater or less expansion of the friction shoe when the collar is moved inwardly, that is, to engage the clutch. This means may be in the form of a bolt 29 threaded into the free end of the jaw 24 with its head 31 in abutting relation with the inner side of the jaw 23. A nut 32 on the bolt 29 may be tightened against the jaw 24 to lock the bolt in set position. It will be noted, in the position in which the collar 19 is shown in the drawing, that the expanded jaws have been moved along the faces 17 to the narrowest point therebetween and consequently have expanded the brake shoe into frictionally fixed relation with the drum face 11. By moving the collar 19 outwardly the expander jaws will be withdrawn allowing the brake shoe to contract, thus disengaging the clutch. By adjusting the bolt 29 the proximity of the outer ends of the expander jaws to each other may be varied so as to effect a variation in the frictional engagement of the clutch and to take up for wear.

It will be noted that the clutch consists of but few parts practically all of which are castings of very simple and substantial construction and the particular arrangement described gives a very efficient and serviceable clutch that can be easily adjusted. Because of the fact that the parts are capable of being cast they may be produced at a very low cost and at the same time be capable of withstanding severe working strains. Furthermore, it will be observed that this clutch may be easily converted from a gear driving clutch to a pulley driving clutch by simply removing the end plate 22, slipping all of the parts off of the shaft 5 and substituting a pulley equipped drum for the gear equipped drum, whereupon the friction shoe and collar may be reassembled.

I claim:

1. A clutch comprising a drive member, a driven member, an expanding friction shoe rotatable with one of said members, said shoe consisting of a unitary piece formed to provide a hub, a web projecting radially therefrom, and a pair of arcuate arms integral with and extending in opposite directions from said web and adapted by reason of their resiliency to be expanded into frictional engagement with the other clutch member, the opposite ends of said arms being provided with opposed converging faces, a member slidable axially of and rotatable with said friction shoe, a pair of jaws pivotally mounted on said member and having their free ends disposed between the opposed ends of said arms, adjustable means connecting the free ends of said jaws whereby the distance between the jaws may be regulated, and means for moving said jaw-carrying member axially of the clutch to expand the arms of said friction shoe.

2. A clutch comprising a driving member, a drum shaped driven member, a friction shoe consisting of a hub, a web projecting radially therefrom and a pair of resilient arms rigidly connected to said web and extending in opposite directions therefrom, a collar movable longitudinally of the driving member and provided with a yoke, a pair of jaws co-axially pivoted in said yoke and extending between the opposed ends of said arms, means for varying the distance between the free ends of said jaws, and means for moving said jaws across the ends of said arms, the ends of said arms being provided with converging faces adapted to be engaged by said jaws to thereby spread the arms into frictional engagement with said drum.

HARRY C. CLAY.

Copies of this patent may be obtained for five cents each, by addressing the "Commissioner of Patents, Washington, D. C."